United States Patent [19]

Hsu

[11] Patent Number: 5,116,215
[45] Date of Patent: May 26, 1992

[54] ACCUMULATOR HEAD FOR EXTRUSION BLOW MOLDING MACHINE

[75] Inventor: John S. Hsu, Cincinnati, Ohio

[73] Assignee: Cincinnati Milacron Inc., Cincinnati, Ohio

[21] Appl. No.: 726,227

[22] Filed: Jul. 5, 1991

[51] Int. Cl.$^5$ ............................................. B29C 49/04
[52] U.S. Cl. ...................................... 425/381; 425/466; 425/532
[58] Field of Search ............... 425/532, 522, 380, 381, 425/466

[56] References Cited

U.S. PATENT DOCUMENTS

| | | | |
|---|---|---|---|
| 4,063,865 | 12/1977 | Becker | 425/532 X |
| 4,182,603 | 1/1980 | Knittel | 425/133.1 |
| 4,201,532 | 5/1980 | Cole | 425/380 |
| 4,305,902 | 12/1981 | Uhlig | 425/532 X |
| 4,422,838 | 12/1983 | Iwawaki et al. | 425/532 X |
| 4,424,178 | 1/1984 | Daubenbüchel et al. | 264/40.1 |
| 4,609,340 | 9/1986 | Irwin et al. | 425/532 |
| 4,731,216 | 3/1988 | Topolski | 425/532 X |
| 4,802,833 | 2/1989 | Shapler | 425/532 X |

FOREIGN PATENT DOCUMENTS 1964675 7/1971 Fed. Rep. of Germany .
59-85720 5/1984 Japan .

*Primary Examiner*—Richard L. Chiesa
*Attorney, Agent, or Firm*—Nies, Kurz, Bergert & Tamburro

[57] ABSTRACT

An accumulator head for an extrusion-blow molding machine. The accumulator head includes an annular inner sleeve member slidably positioned within an accumulator outer barrel, and a tubular inner body member received within the sleeve member. The sleeve member and body member are adapted to be slidable together within the accumulator barrel to expel collected plasticated material. The inner sleeve member includes a pair of external slots formed in the outer surface that communicate with the accumulator inlet and with respective radially extending flow passageways through the inner sleeve to convey plasticated material from the accumulator inlet into a pair of helical flow channels formed in the accumulator inner body member. The flow channels communicate with an outlet area to convey the plasticated material to an inner accumulation chamber through an annular collector channel and an annular flow passageway that provides an extruded parison having a uniform conformation without flow or separation lines. Suitable actuators are provided for together moving the inner sleeve and the inner body member to expel plasticated material, and also to selectively move an inner mandrel to provide a desired parison die outlet opening.

13 Claims, 4 Drawing Sheets

ACCUMULATOR HEAD FOR EXTRUSION BLOW MOLDING MACHINE

BACKGROUND OF THE INVENTION

1. FIELD OF THE INVENTION

The present invention relates to extrusion blow molding machines for providing blow molded containers and other hollow articles. More particularly, the invention relates to an accumulator head for an extrusion blow molding machine wherein plasticated material is received in a tubular accumulator and is then extruded through an outlet die to provide a tubular parison from which the bottle or other hollow article is thereafter formed by blow molding.

2. DESCRIPTION OF THE RELATED ART

Containers and other hollow articles are frequently formed by blow molding, which involves providing a tube of heated and softened plastics material about which a two-piece mold is enclosed, after which air or other gasses are introduced under pressure into the tube to expand it against the walls of the mold to thereby form the desired hollow article. Such blow molding machines can be of various types, the most common of which are extrusion-blow molding machines and injection-blow molding machines.

In extrusion-blow molding machines, plastics material is heated and softened in an extruder and is conveyed into a die head from which a tubular parison is extruded. The parison can either be continuous, whereby a plurality of molds are sequentially enclosed about successive, axially spaced portions of the parison, or individual parisons can be intermittently extruded and subsequently blown. In the latter instance, the die head includes a chamber, usually called an accumulator, in which the extruded material is accumulated to provide a predetermined volume of material, after which the accumulated volume of material is extruded through an extrusion die at the outlet of the accumulator to form a parison having the desired length, diameter, and wall thickness distribution.

Most often, the extrusion head is so oriented as to cause the parison to be extruded downwardly in a substantially vertical direction. Additionally, the heated and softened plastics material is normally provided by a screw-type extruder that is disposed horizontally, and the output from the extruder is discharged horizontally into the extrusion head. Because the extrusion head includes a central cylindrical mandrel to control the flow of material through the accumulator outlet or extrusion die, the horizontally entering material must separate and flow around the cylindrical mandrel and then recombine to permit the material to flow in an annular flow path along the mandrel and toward the extrusion die outlet. Oftentimes, the material does not intimately join together as it flows around the cylindrical mandrel to recombine, thereby resulting in the formation of a joint or flow line that can result in a longitudinal surface line or ridge on the extruded parison. Such a line or ridge on the parison can affect the appearance or quality of the blown article.

It is therefore an object of the present invention to overcome the shortcomings described above.

It is another object of the present invention to provide an accumulator head in which incoming extruded material is divided into a plurality of streams that are then recombined to provide a uniform annular flow of plasticated material to provide a circumferentially uniform extruded parison.

SUMMARY OF THE INVENTION

Briefly stated, in accordance with one aspect of the present invention, an accumulator head is provided for an extrusion-blow molding machine for providing a uniform extruded parison. The accumulator head includes a tubular outer barrel having a barrel wall that includes a cylindrical barrel inner surface, and a material inlet and a material outlet.

An annular inner sleeve is slidably received within the outer barrel for movement along the barrel inner surface. The inner sleeve includes an external, material-receiving slot adapted to communicate with the material inlet of the outer barrel. At least two radially inwardly directed flow apertures extend from the material-receiving slot to the inner surface of the inner sleeve.

A tubular inner body member is slidably received within the inner sleeve for movement along the inner sleeve inner surface, the inner body member including a plurality of helical channels, each channel being in communication with the respective one of the flow apertures in the inner sleeve. The channels extend along the outer surface of the inner body member.

An actuator is provided for simultaneously moving the inner sleeve and the inner body member toward the material outlet to extrude material therethrough and thereby form a parison.

DESCRIPTION OF THE PREFERRED EMBODIMENTS

Figure 1:
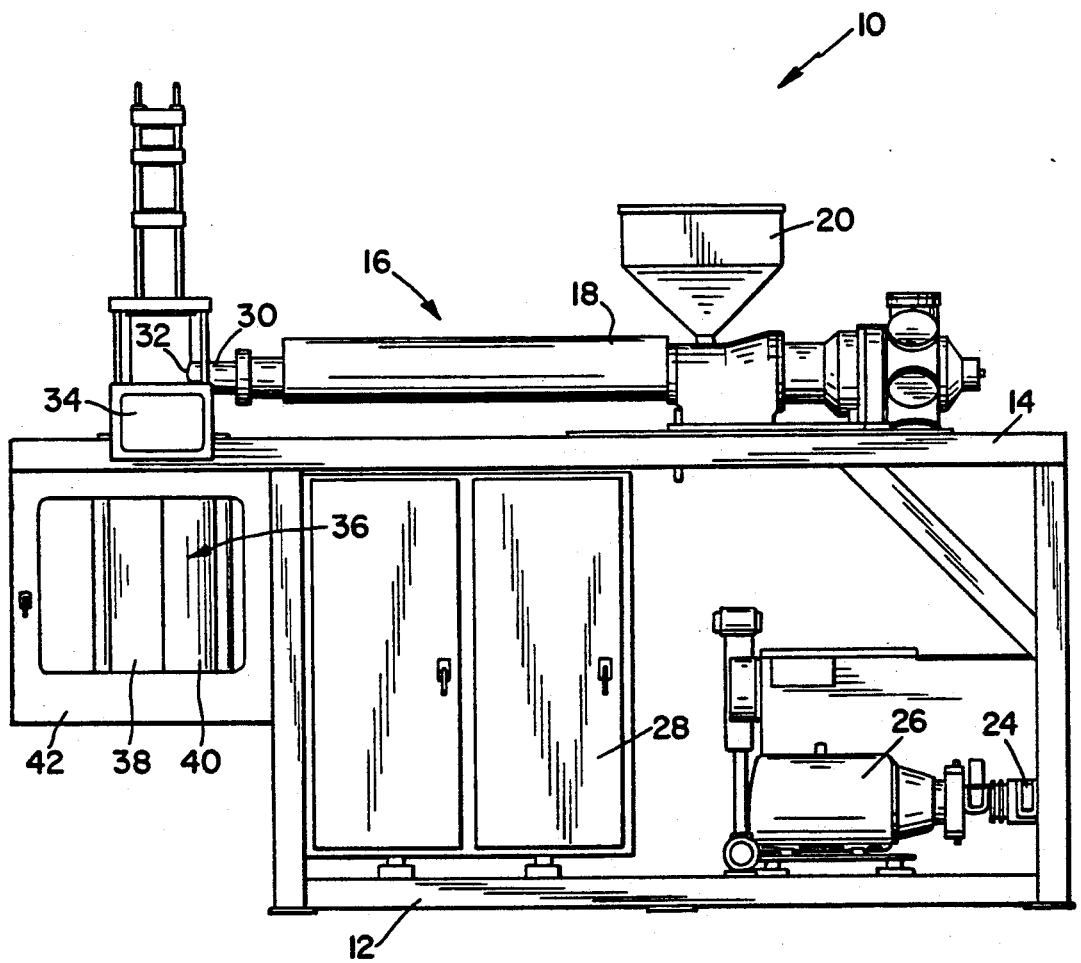
FIG. 1 is a side elevational view of an extrusion-blow molding machine having an accumulator head in accordance with the present invention.

Referring now to the drawings, and particularly to FIG. 1 thereof, there is shown an extrusion-blow molding machine 10 including a generally rectangular base or frame 12. Positioned on the top horizontal frame member 14 is an extruder 16 in the form of a tubular barrel 18 having a rotatable plastication screw (not shown) that includes one or more helical flights for conveying and for softening solid plastics material to provide a viscous, flowable mass for extrusion.

The plastic material is introduced into a feed hopper 20 that communicates with an opening (not shown) in extruder barrel 18. The screw is rotated by an hydraulic motor 22 that receives pressurized hydraulic fluid from an hydraulic pump 24 driven by an electric motor 26. Hydraulic motor 22, hydraulic pump 24, and electric motor 26 are suitably supported on frame 12. Additionally, an electrical system cabinet 28 is provided for housing switches, relays, and the like used for controlling the operation of the machine.

The outlet 30 of the horizontally disposed extruder barrel 18 is connected with a material inlet 32 on a substantially vertically disposed accumulator head 34, which receives the plasticated material from extruder 16. Positioned below accumulator head 34 is a blow mold 36 that can be in the usual form known to those skilled in the art and in the form of two horizontally opposed mold portions 38, 40, each of which has opposed, recessed areas that define a mold cavity (not shown) when the molds are brought together. The mold cavity conforms in shape with the desired external surface conformation of the blow molded article. A slidable cover or gate 42 is provided in front of blow mold 36.

Figure 2:
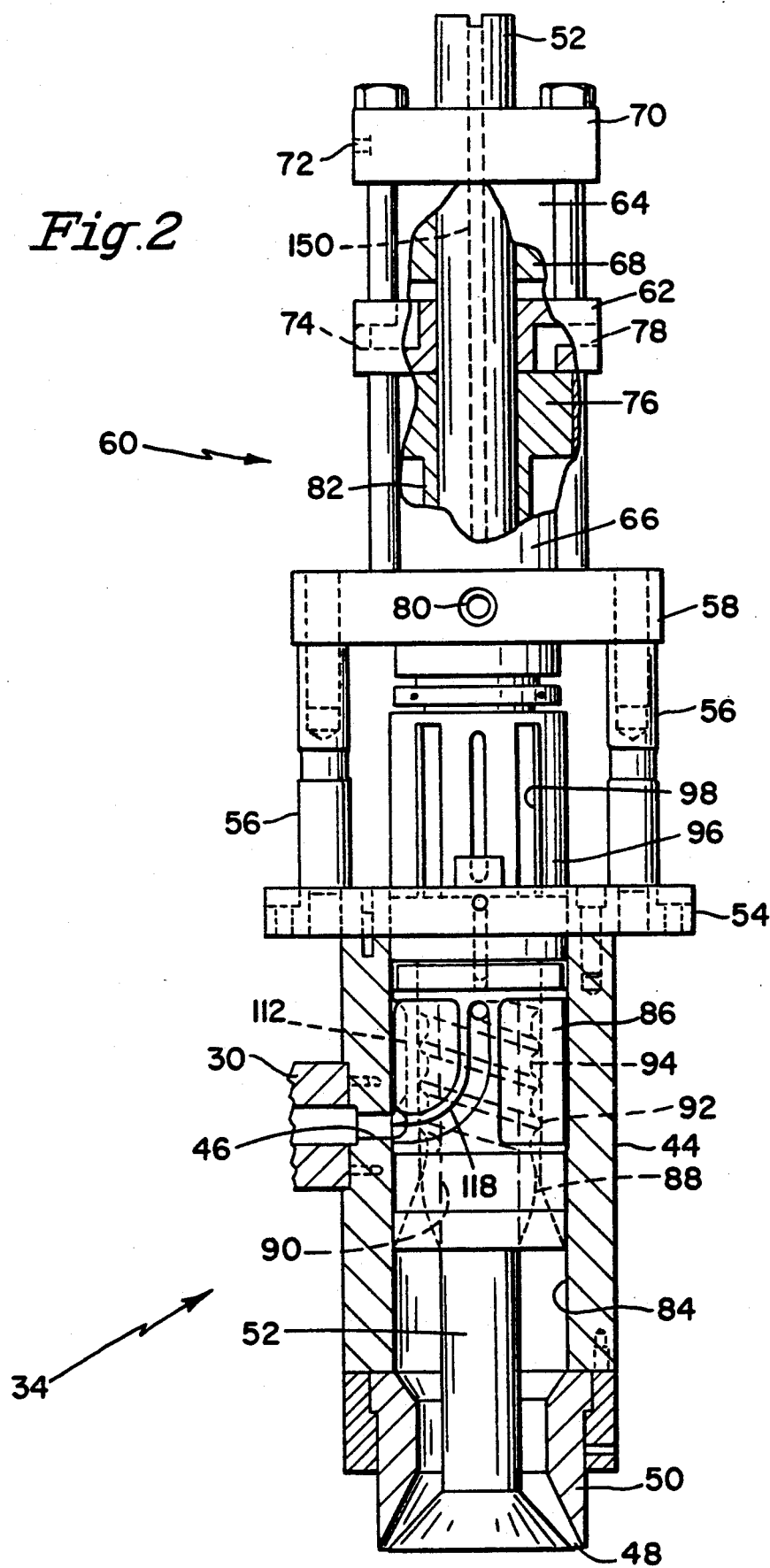
FIG. 2 is a fragmentary side elevational view, partially in section, showing the structure of an accumulator head in accordance with the present invention with an accumulator sleeve and inner body member shown in a retracted position.
Figure 3:
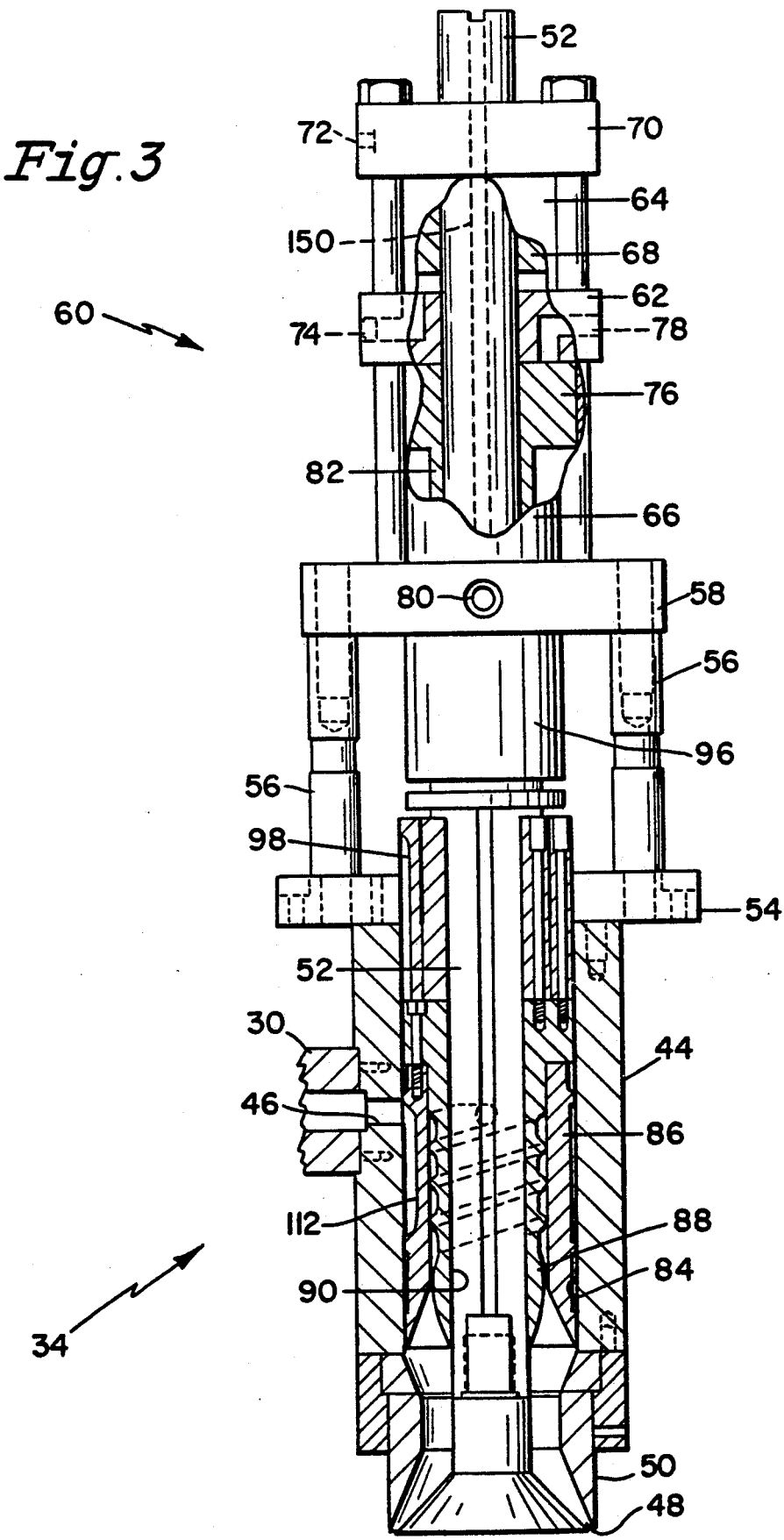
FIG. 3 is a view similar to FIG. 2 showing the accumulator inner sleeve and inner body in an extended position after accumulated material has been expelled from the accumulator through the parison die outlet.

Accumulator head 34 is shown in greater detail in FIGS. 2 and 3. As there shown, an accumulator outer barrel 44 of tubular form is provided and is oriented with its axis extending substantially vertically. A transverse material inlet aperture 46 is provided through the wall of outer barrel 44 to provide communication between the interior of barrel 44 and outlet 30 of extruder 16.

Accumulator outer barrel 44 includes a material outlet in the form of die outlet 48 through which a tubular parison (not shown) is extruded. Die outlet 48 is defined by a die outer ring 50 that is secured to an end of accumulator outer barrel 44, and by an inner mandrel 52 that has an outer cylindrical surface spaced from the inner surface of die outer ring 50 to define a parison outlet of substantially annular form to provide a tubular parison.

The upper end of accumulator outer barrel 44 includes a flange 54 that carries a plurality of axially extending support rods 56 that extend upwardly from flange 54 and connect with a lower end cap 58 of an hydraulic cylinder 60. A divider 62 is positioned within cylinder 60 to divide the cylinder into two separate and distinct, axially aligned cylinders, an upper, programming cylinder 64, and a lower, purge cylinder 66.

Programming cylinder 64 contains a programming piston 68 that is secured to mandrel 52 and is capable of movement in a vertical direction within programming cylinder 64 in response to hydraulic pressure applied to one of the transverse faces of piston 68 to carry mandrel 52 vertically up or down to vary the size of the annular opening at parison die outlet 48. For that purpose, programming cylinder 64 includes a cylinder upper end cap 70 within which a programming cylinder downstroke inlet 72 is provided to communicate with the uppermost surface of programming piston 68. A programming cylinder upstroke inlet 74 is provided in cylinder divider 62 for providing communication with the lowermost surface of programming piston 68.

Purge cylinder 66 contains a purge piston 76 that is capable of sliding movement within cylinder 66 in a vertical direction for expelling material from accumulator head 34, as will be hereinafter described in greater detail. A purge cylinder head end inlet 78 in cylinder divider 62 provides communication with the upper interior end of purge cylinder 66. A purge cylinder rod end inlet 80 is provided in cylinder lower end cap 58. As shown, purge piston 76 includes an annular rod member 82 that surrounds and is slidably carried on mandrel 52.

Accumulator outer barrel 44 has an inner cylindrical surface 84 that slidably receives an annular accumulator inner sleeve member 86. Positioned within inner sleeve member 86 is an inner body member 88, also of annular configuration. Inner body member 88 includes a cylindrical inner surface 90 that surrounds and engages the outer surface of mandrel 52 to permit relative sliding movement inner body member 88 along the outer surface of mandrel 52. The outer surface 92 of inner body member 88 includes a pair of helically disposed channels 94 for conveying plasticated material, as will be hereinafter explained.

Accumulator inner sleeve member 86 and accumulator inner body member 88 are each secured to the lower end of an annular connector member 96 that extends through flange 54 and is connected with annular rod member 82. Connector member 96 includes a plurality of external, longitudinally-extending pressure relief grooves 98 to prevent the build-up of excessive pressure within accumulator 34.

Figure 4:
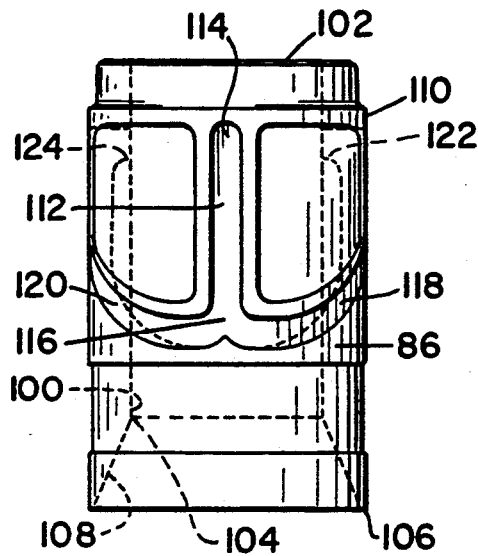
FIG. 4 is a front view of the accumulator inner sleeve looking in the direction of movement of the incoming plasticated material that enters the sleeve from the extruder.
Figure 5:
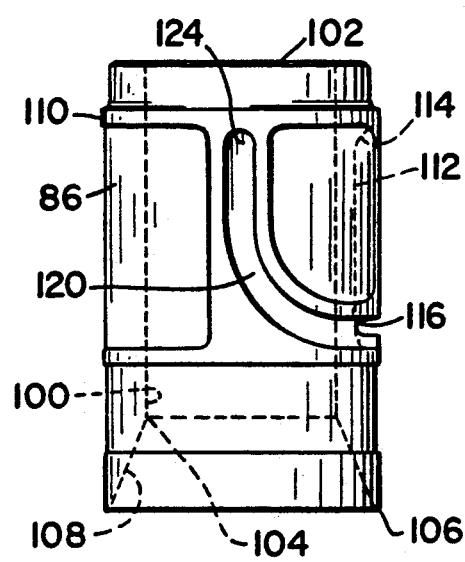
FIG. 5 is a side view of the accumulator inner sleeve, rotated 90° about its own axis relative to the position shown in FIG. 4.

Referring now to FIGS. 4 and 5, accumulator inner sleeve 86 is of generally annular configuration and includes a cylindrical inner bore 100 that extends from an upper end wall 102 to a point 104 inwardly of a lower end 106, and that then flares downwardly and outwardly to define a diverging wall 108. Outer surface 110 of inner sleeve member 86 includes a longitudinally extending peripheral flow slot 112 that extends along approximately one-half the axial length of inner sleeve member 86. The upper end 114 of slot 112 is closed, and the lower end 116 communicates with a pair of side channels 118, 120, each of which curves around from lower end 116 and upwardly along about one-quarter of the outer periphery 110 of sleeve member 86 to terminate in respective radially inwardly extending flow apertures 122, 124 that pass through the sidewall of sleeve 86 to provide communication with inner bore 100. Apertures 122, 124 are in opposed relationship, and are at substantially the same axial height along the axis of sleeve member 86 as slot upper end 114.

Figure 6:
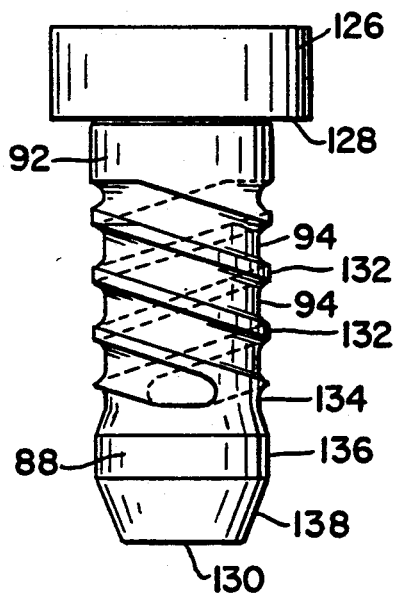
FIG. 6 is a side view of the accumulator inner body member.
Figure 7:
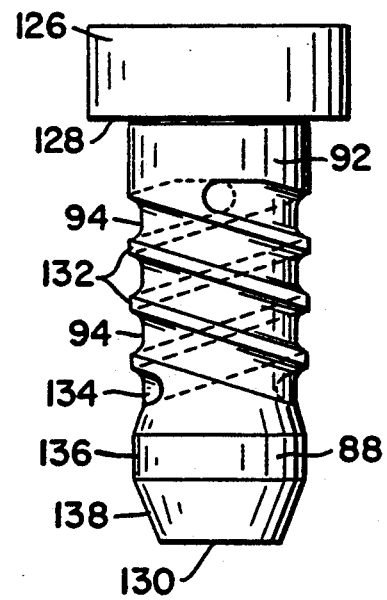
FIG. 7 is another side view of the inner body member, rotated 90° about its own axis relative to the position shown in FIG. 6.

Inner body member 88 is shown in greater detail in FIGS. 6 and 7 and includes an upper flange 126 that is adapted to be connected with annular connector member 96. Body member 88 is of generally tubular form and includes an inner bore defining cylindrical inner surface 90, and includes cylindrical outer surface 92 that extends from an annular shoulder 128, defined by upper flange 126, toward the lower end 130 of body member 88. Outer surface 92 includes a pair of helical flow channels 94 that each commence at an axial position spaced downwardly from annular shoulder 128 and continue to a point spaced upwardly from lower end 130 of inner body member 88. The respective flow channels 94 are defined and separated by helical, outwardly extending ridges 132 that gradually diminish in outer diameter in a direction toward lower end 130. In that regard, the taper of the outer surfaces of helical ridges 132 defines an angle with the axis of inner body 88 of about 1°. The lowermost termination points of the respective flow channels 94 communicate with an annular collector recess 134 on the outer surface of inner body 88. Immediately below annular collector recess 134 is an outer annular ridge 136 having an outer diameter less than the outer diameter of inner body member 88 at a point adjacent upper flange 126. Downwardly of outer annular ridge 136 inner body member 88 tapers inwardly to define a converging section 138.

In operation, plasticated material issues from extruder 16 through extruder outlet 30 and into accumulator inlet aperture 46. As shown in FIGS. 2 and 3, longitudinally extending peripheral flow slot 112 of inner sleeve member 86 is oriented so that it faces inlet aperture 46 so that material enters accumulator 34 and flows into flow slot 112.

Initially, accumulator inner sleeve 86 and inner body 88, which are fastened together to move as a unit, are in the extended position as shown in FIG. 3. After the plasticated material flows through accumulator inlet aperture 46 and into flow slot 112 it divides and flows into respective side channels 118 and 120 and passes around the outer periphery of inner sleeve member 86 toward respective flow apertures 122, 124. The material then passes through flow apertures 122, 124 and enters the respective helical channels 94 in inner body member 88. Channels 94 are so oriented that their respective beginning points are positioned opposite respective flow apertures 122, 124, so that the plasticated material flows along respective channels 94 toward lower end 130 of inner body member 88.

As the material flows in a helical and downward direction along channels 94, because of the diminishing outer diameter of helical ridges 132 some of the material flows over the edges of ridges 132 to intermix with material in the adjacent channels. The material continues to intermix and flow along channels 94, whereupon the flow streams enter annular recess 134 to combine into a unitary, annular flow stream which then passes over annular ridge 136 to enter the diverging area zone defined between diverging wall 108 in inner sleeve member 86 and converging section 138 of inner body member 88.

Because initially mandrel 52 is in an upward, retracted position, to close the parison die outlet 42, the plasticated material that enters the diverging area zone collects within the lowermost end of accumulator outer barrel 44 in the annular volume defined between accumulator outer barrel 44 and mandrel 52. As the material continues to flow and accumulate, the assembly of inner sleeve member 86 and inner body member 88 is gradually pushed upwardly by the continuously accumulating material until it reaches a predetermined vertical position from parison die outlet 42 that corresponds with a desired volume of accumulated material. If the maximum volume of material is desired to be accumulated, the assembly of inner sleeve 86 and inner body 88 will have moved to the uppermost position within accumulator inner sleeve 44 as illustrated in FIG. 2. As the assembly of inner sleeve 86 and inner body 88 is moved upwardly within accumulator outer barrel 44, peripheral flow slot 112 remains in continuous communication with inlet aperture 46 to provide a continuous flow path from extruder 16 to the interior of accumulator head 34.

When the desired volume of material has been accumulated with accumulator outer barrel 44, programming piston 68 is hydraulically actuated to move in a downward direction to provide the desired degree of opening at parison die outlet 42. Purge piston 76 is then actuated to move in a downward direction to drive the assembly of inner sleeve 86 and inner body 88 in a downward direction, as viewed in FIGS. 2 and 3, to the position shown in FIG. 3 in order to expel the plasticated material from accumulator barrel 44 in the form of an annular parison. When the parison has been extruded to its desired length, the blow mold halves are enclosed around it and blowing air can be introduced into a blowing air passageway 150 that extends within mandrel 52 to the lowermost end thereof to expand the parison to fill the mold cavity defined by the blow mold halves.

If desired, the wall thickness of the extruded parison can be varied as the parison is being extruded. For that purpose, a suitable programming arrangement, the structure and operation of which is familiar to those skilled in the art, can be employed to control the magnitude and direction of the hydraulic pressure acting on programming piston 68 to move it up or down as necessary to obtain a desired parison wall thickness distribution.

As will be apparent, annular recess 134 in inner body member 88 provides an annular material collection channel from which the plastic material issues in an axial direction around the lowermost end of inner body member 88 to provide a continuous, uninterrupted flow of plasticated material without a linear flow or separation line of the type that usually resulted from the prior art devices when two different flows of the plasticated material were rejoined.

Although particular embodiments of the present invention have been illustrated and described, it will be apparent to those skilled in the art that various changes and modifications can be made without departing from the spirit of the present invention. It is therefore intended to encompass within the appended claims all such changes and modifications that fall within the scope of the present invention.

What is claimed is:

1. An accumulator head for an extrusion-blow molding machine, said accumulator head comprising:
   a. a tubular outer barrel having a barrel wall and a barrel inner surface, the outer barrel including a material inlet and a material outlet;
   b. an annular inner sleeve member slidably received within the outer barrel for movement along the barrel inner surface, the inner sleeve member having an inner sleeve inner surface and including an external, material-receiving slot in communication with the outer barrel material inlet, and at least two radially inwardly directed flow apertures providing communication between the material-receiving slot and the inner surface of the inner sleeve member;
   c. a tubular inner body member received within the inner sleeve member for engagement with the inner sleeve inner surface, the inner body member including a plurality of external helical channels, each channel being in communication with a respective one of the flow apertures in the inner sleeve to provide helical flow passageways between the inner body member and the inner sleeve member; and
   d. an actuator connected with the inner sleeve and the inner body member for simultaneously moving the inner sleeve and inner body member toward the outer barrel material outlet to extrude material therethrough.

2. An accumulator head in accordance with claim 1, including a cylindrical mandrel extending through the inner body member, the mandrel having an end positioned opposite the outer barrel material outlet to define therewith an annular die opening to form a tubular parison as material exits from the barrel material outlet.

3. An accumulator head in accordance with claim 1, wherein the outer barrel material inlet passes laterally through the barrel wall.

4. An accumulator head in accordance with claim 1, wherein the external, material receiving slot in the annular inner sleeve member extends longitudinally.

5. An accumulator head in accordance with claim 4, including a plurality of branching slots that extend from the longitudinal slot externally around the sleeve member to respective flow apertures in the inner sleeve member.

6. An accumulator head in accordance with claim 5, wherein the branching slots extend from one end of the longitudinal slot and terminate at a point substantially opposite from an opposite end of the longitudinal slot.

7. An accumulator head in accordance with claim 1, wherein the annular inner sleeve member has an end that includes an outwardly sloping inner wall to define an outwardly diverging surface.

8. An accumulator head in accordance with claim 1, wherein the tubular inner body member includes an inwardly sloping end adjacent the barrel outlet to define an enlarging flow area opening between the inner sleeve member and the inner body member.

9. An accumulator head in accordance with claim 1, wherein the tubular inner body member has an outer diameter that diminishes gradually from one end toward the other end.

10. An accumulator head in accordance with claim 9, wherein the outer diameter tapers at an angle of about 1° relative to the tubular inner body member axis.

11. An accumulator head in accordance with claim 1, including a first actuator connected with the inner sleeve and the inner body member for shifting the inner sleeve member and the inner body member together axially within the barrel to purge collected plasticated material from the barrel and through the die outlet flow area.

12. An accumulator head in accordance with claim 11, including a second actuator connected with the mandrel for axially slidably moving the mandrel relative to the barrel to change the die outlet flow opening area.

13. An accumulator head in accordance with claim 1, including an annular flow collection chamber between the inner sleeve member and the inner body member, the collection chamber communicating with the helical channels to receive individual flows from the channels to provide a unitary annular outlet flow of material.

* * * * *